United States Patent
Shin et al.

(10) Patent No.: US 9,582,711 B2
(45) Date of Patent: Feb. 28, 2017

(54) ROBOT CLEANER, APPARATUS AND METHOD FOR RECOGNIZING GESTURE

(71) Applicant: LG ELECTRONICS INC., Seoul (KR)

(72) Inventors: Yongmin Shin, Seoul (KR); Euntai Kim, Seoul (KR); Jeonghyun Baek, Seoul (KR)

(73) Assignees: LG ELECTRONICS INC., Seoul (KR); Industry-Academic Cooperation Foundation, Yonsei University, Seoul (KR)

( * ) Notice: Subject to any disclaimer, the term of this patent is extended or adjusted under 35 U.S.C. 154(b) by 0 days.

(21) Appl. No.: 14/701,195

(22) Filed: Apr. 30, 2015

(65) Prior Publication Data
US 2015/0363637 A1    Dec. 17, 2015

(30) Foreign Application Priority Data
Jun. 16, 2014 (KR) ........................ 10-2014-0072838

(51) Int. Cl.
G06K 9/00 (2006.01)
G06F 3/01 (2006.01)
G06T 1/00 (2006.01)
G06T 7/00 (2006.01)

(52) U.S. Cl.
CPC ......... G06K 9/00335 (2013.01); G06F 3/017 (2013.01); G06T 1/0014 (2013.01); G06T 7/004 (2013.01); A47L 2201/04 (2013.01); Y10S 901/01 (2013.01); Y10S 901/46 (2013.01)

(58) Field of Classification Search
None
See application file for complete search history.

(56) References Cited

U.S. PATENT DOCUMENTS

| 8,417,383 B2* | 4/2013 | Ozick ................. G05D 1/0231 700/245 |
| 9,317,038 B2* | 4/2016 | Ozick ..................... A47L 9/009 |
| 2009/0180668 A1* | 7/2009 | Jones ..................... G06F 3/017 382/103 |
| 2010/0256812 A1* | 10/2010 | Tsusaka ................... A47L 9/24 700/254 |
| 2013/0056032 A1* | 3/2013 | Choe ...................... A47L 9/0488 134/18 |
| 2015/0026646 A1* | 1/2015 | Ahn ................... G06K 9/00201 715/863 |

FOREIGN PATENT DOCUMENTS

| KR | 1020120116278 A | 10/2012 |
| KR | 1020130081126 A | 7/2013 |
| KR | 1020140022654 A | 2/2014 |
| WO | 2013085085 A1 | 6/2013 |

* cited by examiner

*Primary Examiner* — Nancy Bitar
(74) *Attorney, Agent, or Firm* — Dentons US LLP (57) ABSTRACT

A robot cleaner is provided. The robot cleaner includes a camera obtaining an image including a user; and a control unit extracting, an arm image including an arm, from the image obtained by the camera, calculating an angle of an arm of an user from the arm image, and determining a function intended by the angle of the arm calculated to control execution of the function.

15 Claims, 11 Drawing Sheets
(8 of 11 Drawing Sheet(s) Filed in Color)

→ PRIMARY ANGLE DIRECTION
→ DIRECTION PERPENDICULAR TO PRIMARY ANGLE

FIG.6(a) IMAGE OF ARM PART

FIG.6(b) CELL HISTOGRAM

FIG.6(c) PRIMARY ANGLE

FIG.6(d) SCORE CALCULATION RESULT

FIG.7(a) IMAGE OF ARM PART      FIG.7(b) HOG      FIG.7(c) ANGLE INFORMATION ACCORDING TO EMBODIMENT

| AVERAGE CALCULATION TIME | FALSE DETECTION RATE |
|---|---|
| 0.68ms | 2.32% |

ROBOT CLEANER, APPARATUS AND METHOD FOR RECOGNIZING GESTURE

CROSS-REFERENCE TO RELATED APPLICATIONS

The present application claims priority under 35 U.S.C. 119 and 35 U.S.C. 365 to Korean Patent Application No. 10-2014-0072838 (filed on Jun. 16, 2014), which is hereby incorporated by reference in its entirety.

BACKGROUND

The present disclosure relates to a robot cleaner, an apparatus and method for recognizing a gesture.

A gesture recognition technology may be pointed out as one of significantly important researches in a human-computer interaction (HCI) or human-robot interaction (HRI) field. It is being actually commercialized for many products, such as moving a screen on the smart phone by a finger tip gesture or controlling the volume or performing a simple command by a gesture using a remote control on the smart TV or by a simple hand gesture.

At present, various researches are being actively performed on such a gesture recognition technology. A gesture recognition method may be divided into two sections, one corresponding to a method of detecting and tracking a hand for recognition and the other corresponding to a method of estimating the general posture (pose) of a user.

The method of detecting and tracking the hand for recognition recognizes a user gesture through a tracked path, detecting and tracking a hand from an image. Since the shape of a hand is not constant, such a method detects the hand based on the color of the hand on a color image or by detecting the trajectory of the hand by the wearing of a glove in specific color or a specific sensor such as a remote control, thus there is a limitation in that there is a need to be a single black and white image or an image sensor needs another sensor or equipment.

On the contrary, the method of estimating the posture of a user recognizes the posture of the user separately with respect to the foreground and the background on a stereo image using two image sensors or recognizes the posture by using a partial detection result of the head, an arm or leg on a single image. However, such a method also has a limitation in that a further image sensor is needed, or it is not easy to recognize on a low quality image or when the size of the user on an image is small.

Since an image obtained by a robot cleaner camera is a low-quality single black and white image such as a 320×240 image, it needs a gesture recognition approach different from the gesture recognition technologies as mentioned above.

Also, in order to be actually applied to the robot cleaner, the calculation of the gesture recognition technology needs to be performed in real time.

A gesture recognition technology using a stereo camera is disclosed in Korean Patent No. 10-1347840 that is a prior literature.

SUMMARY

Embodiments provide an apparatus and method for recognizing a gesture, and a robot cleaner.

In one embodiment, a robot cleaner includes a camera obtaining an image including a user; and a control unit to extract, an arm image including an arm, from the image obtained by the camera, calculate an angle of an arm of an user from the arm image, and determine a function intended by the angle of the arm calculated to control execution of the function.

In another embodiment, an apparatus for recognizing a gesture includes a camera to obtain an image including a user; and a control unit to extract, an arm image including an arm, from the image obtained by the camera, and calculate an angle of an arm of a user on the arm image.

In further another embodiment, a method of recognizing a gesture includes: extracting an arm image from an image obtained by a camera; dividing the extracted arm image into a plurality of cell images and calculating a histogram of each cell image; calculating a primary angle for each cell image based on the histogram of each cell image; calculating a score of each cell image based on a primary angle of each cell image; and calculating an angle of the arm based on the score of each cell image calculated.

The details of one or more embodiments are set forth in the accompanying drawings and the description below. Other features will be apparent from the description and drawings, and from the claims.

BRIEF DESCRIPTION OF THE DRAWINGS

The patent or application contains at least one drawing and at least one photograph executed in color. Copies of this patent or patent application publication with color drawings and photographs will be provided by the Office upon request and payment of the necessary fee.

FIG. 3b is a gradient histogram of each cell image in FIG. 3a.

DETAILED DESCRIPTION OF THE EMBODIMENTS

Reference will now be made in detail to the embodiments of the present disclosure, examples of which are illustrated in the accompanying drawings.

In the following detailed description of the preferred embodiments, reference is made to the accompanying drawings that form a part hereof, and in which is shown by way of illustration specific preferred embodiments in which the invention may be practiced. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense.

Also, in the description of embodiments, terms such as first, second, A, B, (a), (b) or the like may be used herein when describing components of the present invention. Each of these terminologies is not used to define an essence, order or sequence of a corresponding component but used merely to distinguish the corresponding component from other component(s). It should be noted that if it is described in the specification that one component is "connected," "coupled" or "joined" to another component, the former may be directly "connected," "coupled," and "joined" to the latter or "connected", "coupled", and "joined" to the latter via another component.

Figure 1:
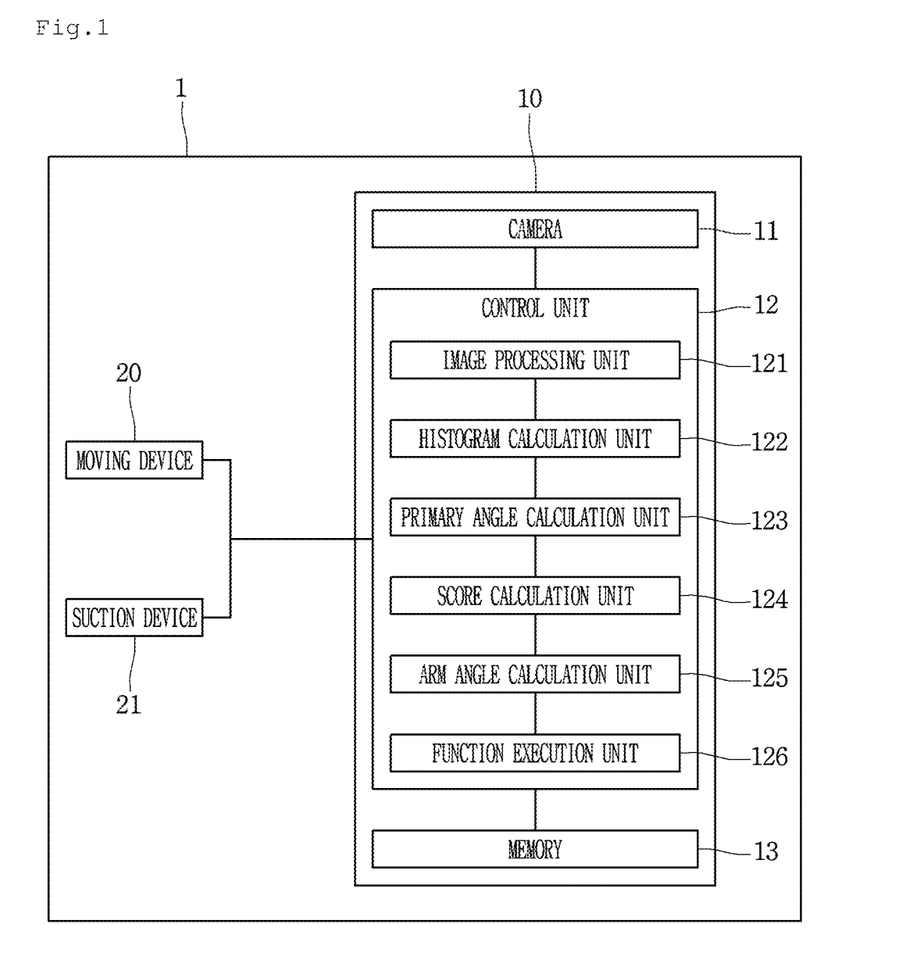
FIG. 1 is a block diagram of a robot cleaner according to an embodiment.

FIG. 1 is a block diagram of a robot cleaner according to an embodiment.

Referring to FIG. 1, a robot cleaner 1 according to an embodiment may include a gesture recognition apparatus 10 (hereinafter, referred to as "recognition apparatus" for the convenience of description) for recognizing the gesture of a user.

The recognition apparatus 10 may be disposed on a side of a casing that forms the exterior of the robot cleaner 1. The recognition apparatus 10 may include a camera 11 that may obtain an image, a control unit 12 that recognizes the angle of the arm of a user by using an arm angle extraction algorithm on the image recognized by the camera 11, and a memory 13 storing information.

Also, the robot cleaner 1 may further include a moving device for moving the casing, and a suctioning device 21 for suctioning dust.

It should be noted that the camera 11 may be disposed on the front, lateral or top surface of the casing but in the present embodiment, there is no limitation in the location of the camera 11.

The moving device 20 may include a plurality of wheels and a plurality of motors for driving the plurality of wheels, respectively though not shown.

The control unit 12 may control the robot cleaner 1 based on information extracted by using the arm angle extraction algorithm. That is, the control unit 12 may determine a function to be performed by the robot cleaner based on the angle of an arm obtained on an arm image, and enable the robot cleaner 1 to execute a determined function.

The control unit 12 may include an image processing unit 121 for dividing the arm image into a plurality of cell images.

The control unit 12 may further include a histogram calculation unit 122 calculating the histogram of each of the plurality of cell images.

The control unit 12 may further include a primary angle calculation unit 123 calculating a primary angle for each cell image based on the histogram of each cell image.

The control unit 12 may further include a score calculation unit 124 calculating the score of each cell image based on the primary angle of each cell image.

The control unit 12 may further include an arm angle calculation unit 125 calculating the angle of an arm based on the score of each cell image calculated.

The control unit 12 may further include a function execution unit 126 for executing the function of the robot cleaner based on arm angle information calculated.

The image processing unit 121, calculation units 122 to 125, and function execution unit 126 are divided based on functions and may be configured to operate as one or more software modules in order to execute functions in the present embodiment.

The control unit 12 may control the moving device 20 based on the angle of the arm obtained from the arm image. In the present disclosure, the robot cleaner 1 may move to a specific location by the controlling of the moving device 20 by the control unit 12.

In the present disclosure, recognizing a gesture means that the control unit 12 recognizes a gesture in a stationary state.

In the following a gesture recognition method and an arm angle extraction algorithm are described.

Figure 2:
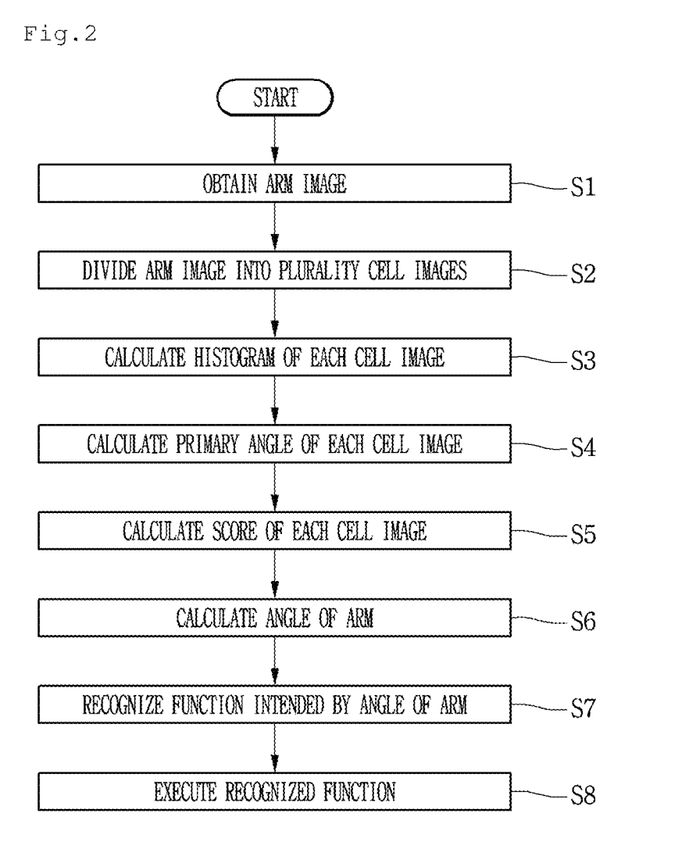
FIG. 2 is a flow chart of a gesture recognition method according to an embodiment.
Figure 3A:
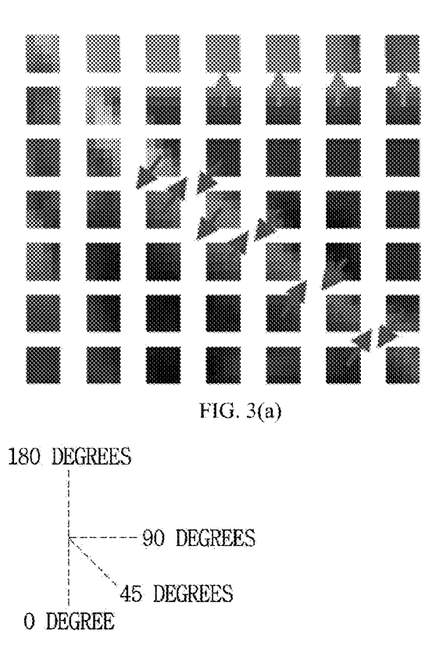
FIG. 3a shows cell images obtained by dividing an image including an arm obtained by a camera at regular intervals.
Figure 3B:
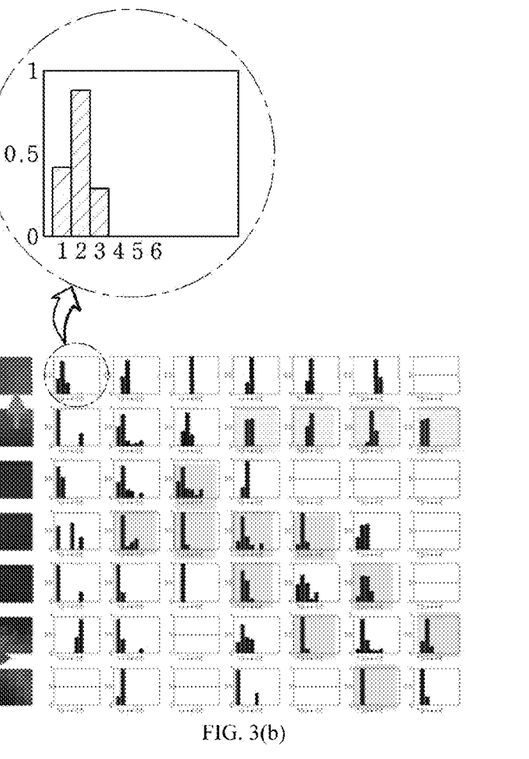

FIG. 2 is a flow chart of a gesture recognition method according to the present embodiment, FIG. 3a shows cell images obtained by dividing an image including an arm obtained by a camera at regular intervals, and FIG. 3b is a gradient histogram of each cell image in FIG. 3a.

Referring to FIG. 2, the camera 11 may obtain an image including an arm in step S1.

The image processing unit 121 may divide an obtained image (hereinafter, referred to as an "initial image") itself into a plurality of cell images, or extract the initial image from the image including the arm (hereinafter, referred to as an "arm image") from the initial image and then divide an extracted arm image into a plurality of cell images in step S2.

As an example, the image processing unit 121 may extract the face and shoulder of a human being from the initial image obtained by the camera 11 and recognize the arm of the human being based on an extracted face and shoulder. In addition, the image processing unit 121 may extract the arm image from the initial image. In this case, the image processing unit 121 may determine which arm is included in the arm image obtained based on the extracted face and shoulder, i.e., whether a left arm or right arm is included.

In addition, the histogram calculation unit 122 finds gradient on each cell image and obtains a histogram in each gradient direction in step S3. In this case, each cell image may include a plurality of pixels and obtain a histogram in each gradient direction between two neighboring pixels. In this case, the gradient direction may be set to be within a range of 0 degree to about 180 degrees and divided into a plurality of bins by a reference angle. In this case, the reference angle may be e.g., 30 degrees, thus a single histogram has 6 bins in FIG. 3b. In addition, the smaller a number corresponding to the bin in FIG. 3b is, the smaller the angle is. For example, the range of angles the second bin of a specific histogram may be about 30 degrees to about 60 degrees.

FIG. 3a represents e.g., a user's left arm, an arm on the arm image may be white parts and it is assumed that the angle of the arm is e.g., degrees.

Most of histograms located at edges corresponding to the arm have similar histograms and the histograms have maximum histogram values at an angle perpendicular to the angle of the arm. As an example, 3rd row and 2nd column, 4th row and 2nd column, 4th row and 3rd column, and 4th row and 4th column have maximum values in their second bins including 45 degrees being an angle perpendicular to 135 degrees.

However, since the image obtained by the camera includes edge information on other objects as well as the edge of the arm, a typical method containing all edge information in the image has a limitation in recognizing and estimating the angle of the arm.

Thus, the present embodiment uses a score calculation algorithm that calculates a score for every edge part histogram corresponding to the arm to remove edge information on other objects.

Figure 4:
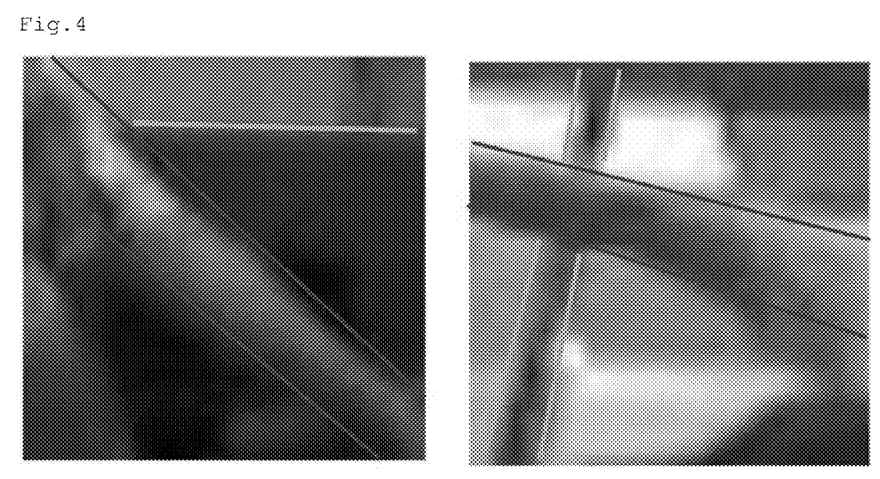
FIG. 4 represents the edge of an arm and other edges on an arm image.

FIG. 4 represents the edge of an arm and other edges on an arm image.

Referring to FIG. 4, an edge corresponding to the arm on an arm part image has the following characteristics.

Firstly, two edges are substantially parallel to each other and secondly, the edge of the arm is longer than those of other objects in an image in which the arm appears. A score is calculated for each histogram by using these two characteristics.

In the present disclosure, "substantially parallel to" means a layout similar to a parallel layout as well as a parallel layout itself.

First, the angle of a bin having a highest value and having a value equal to or larger than a reference value on each histogram is designated as a primary angle of a histogram. In the present embodiment, the primary angle of the histogram may be selected within a range of angles that each bin includes.

When each histogram has B bins and the unit of the angle of the bin of the histogram is b, and the reference value is τ, the primary angle D of each histogram may be found by a criterion such as Equation 1:

$$D = \begin{cases} b \times \mathrm{argmax} p(i) & \text{if } \max p(i) > \tau \\ 0 & \text{if } \max p(i) \leq \tau \end{cases} \quad \langle \text{Equation 1} \rangle$$

$$i = 1, \ldots, B$$

That is, the primary angle calculation unit 123 calculates the primary angle of each cell image based on the histogram of each cell image in step S4.

Next, the score calculation unit 124 determines the similarity of the histogram of each cell image to a neighboring histogram to calculate a score in step S5.

Figure 5:
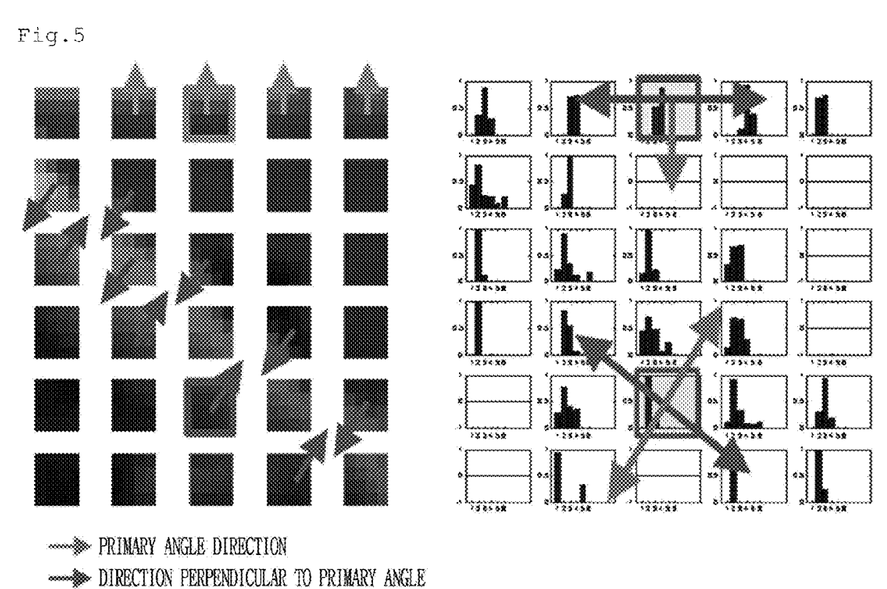
FIG. 5 shows different search directions according to every primary angle of the histogram of each cell image.

FIG. 5 shows different search directions according to every primary angle of the histogram of each cell image.

In FIG. 5, the green direction represents the direction of the primary angle of the histogram and the red direction represents a direction perpendicular to the primary angle. When an approximate value obtained by the comparing with a neighboring histogram in the direction of the primary angle is higher than a reference value, a first reference score (e.g., 3 points) is allocated to a corresponding histogram. When there are two histograms p and q, the approximate value of the two histograms is defined by Equation 2:

$$Sim(p, q) = \sum_i \sqrt{p(i) q(i)} \quad i = 1, \ldots, B \quad \langle \text{Equation 2} \rangle$$

Next, when a search is performed in the direction perpendicular to the primary angle and an approximate value obtained by the comparing with a neighboring histogram being a comparison target exceeds the reference value, a second reference score (e.g., 1 point) lower than the first reference score is allocated to the histogram.

When a score is allocated to each histogram in such a way, as histograms similar to an edge direction increase, i.e., as histograms have the edge characteristics of an arm, the histograms obtain higher scores.

FIGS. 6a to 6d show the process of calculating the score of an arm image having an angle of 45 degrees.

Referring to FIGS. 6a to 6d, it may be seen that all of histograms located at the edge of an arm have similar shapes having high values at angles perpendicular to the angel of an arm, when the arm image is divided into a plurality of cell images and the gradient of each cell image is found.

In addition, when a score is calculated for each histogram in such a way, it may be confirmed that the higher score is allocated to histograms located at the edge of the arm than the edges of other objects.

Figure 6A:
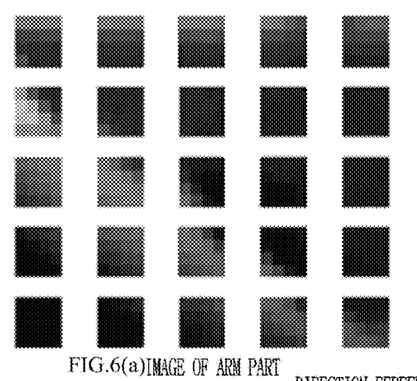
FIGS. 6a to 6d show the process of calculating the score of an arm image having an angle of 45 degrees.
Figure 6B:
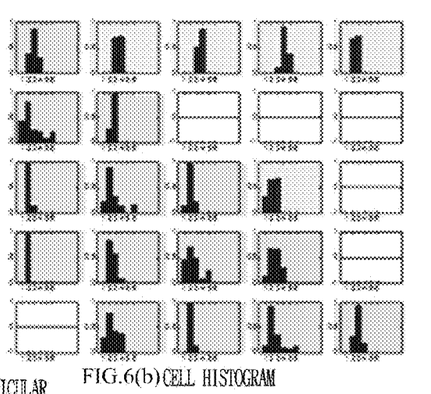
Figures 6C, 6D:
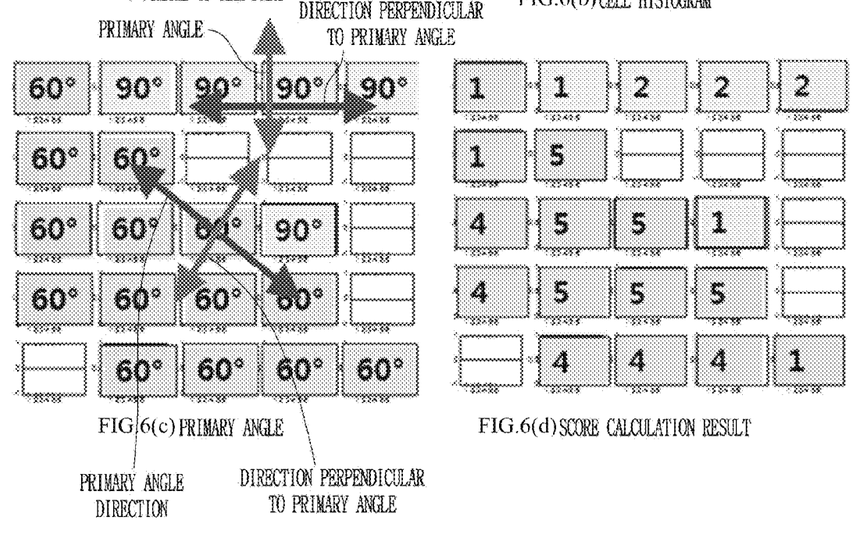

A method of calculating a score for a histogram is simply described with reference to FIGS. 6c and 6d.

As an example, when a discussion is made based on the histogram corresponding to 3rd row and 3rd column, histograms having a primary angle among histograms neighboring in a direction perpendicular to the primary angle on the histogram corresponding to the 3rd row and 3rd column are histograms corresponding to 2nd row and 2nd column and 4th row and 4th column and thus there are two histograms. Thus, two points are first allocated by the existence of two histograms having similarity. Next, there is a single histogram corresponding to 4th row and 2nd column in the direction of the primary angle on the histogram corresponding to the 3rd row and 3rd column. Thus, 3 points are allocated to the histogram corresponding to the 3rd row and 3rd column by the addition of the existence of a single histogram having similarity.

Thus, the score of the histogram corresponding to the 3rd row and 3rd column is finally calculated as 5 points. In such a way, the score of each histogram may be calculated as shown in FIG. 6d.

By using such a score of each histogram, the arm angle calculation unit 125 may obtain information needed for calculation of the angle of an arm of a user and calculate the angle of the arm in step S6.

In particular, the arm angle calculation unit 125 may use the score of each histogram to obtain first information suitable for the calculation of the angle of the arm.

The first information suitable for the calculation of the angle of the arm may include angle information and location information. The angle information represents the sum of scores according to the primary angle of each histogram, as a histogram.

When the characteristic of an angle part is F ang, the score matrix of each cell histogram is s (w, h), the primary angle matrix of each cell histogram is D(w, h), and a normalization constant is η, obtainable angle information may be defined by Equation 3:

$$F_{ang}(i) = \frac{1}{\eta} \sum_w \sum_h \{S(w, h) \delta(D(w, h) - b(i))\} \quad \langle \text{Equation 3} \rangle$$

$$i = 1, \ldots, B$$

Since histograms located at the edge of the arm have the higher scores than histograms of other parts, the angle of gradient corresponding to the actual angle of the arm has more values than angle information obtained in the present embodiment.

Figure 7A:
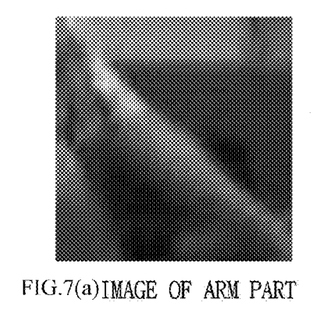
FIGS. 7a to 7c are diagrams for comparing, angle information calculated by an arm angle calculation unit according to an embodiment, with a result of an HOG characteristic calculation method for typical histogram calculation.
Figure 7B:
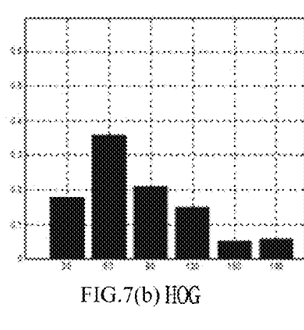
Figure 7C:
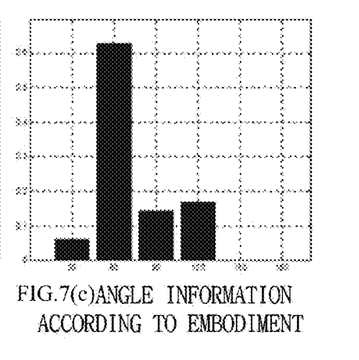

FIGS. 7a to 7c are diagrams for comparing, angle information calculated by an arm angle calculation unit according to an embodiment, with a result of an HOG characteristic calculation method for typical histogram calculation.

FIG. 7b shows a result of using a typical, general HOG characteristic calculation method after dividing an arm image into cell images.

Referring to FIGS. 7a to 7c, it may be confirmed that angle information calculated in the present embodiment has effectively excluded gradient information on other edges excluding the angle of an arm, whereas the typical, general HOG characteristic calculation method includes gradient information on other edges as well the arm.

As described above, a high score is allocated to the histogram located at an arm part. Thus, in calculating the angle of the arm, the location distribution of each histogram score may also be an important characteristic.

Figure 8A:
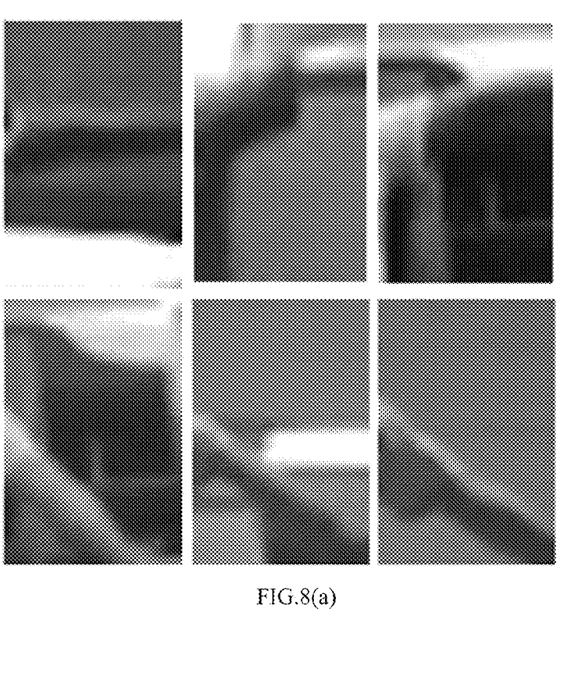
FIGS. 8a and 8b show the average distribution of histogram scores when the angle of an arm is 45 degrees and 90 degrees.
Figure 8B:
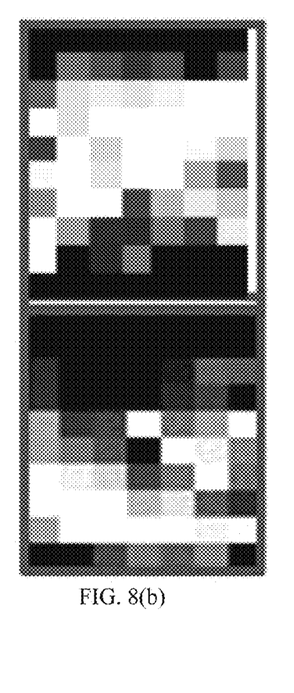

FIGS. 8a and 8b show the average distribution of histogram scores when the angle of an arm is 45 degrees and 90 degrees.

FIG. 8a shows the angle of an arm and FIG. 8b shows location information according to the angle of the arm.

Referring to FIG. 8b, when the angle of the arm is 90 degrees, high scores (white parts) are mostly located at the upper parts and when the angle of the arm is 45 degrees, high scores are usually located at the lower parts. Thus, by arranging the scores of each histogram in a row to change them to vector, it is possible to utilize the scores of each histogram as location information for the calculation of the angle of the arm.

The location information F log is defined by Equation 4. In Equation, W denotes the width size of a cell histogram matrix and H denotes the height size thereof.

$$F_{loc}((h-1)W + w) = \frac{1}{\eta} S(w, h) \quad \langle\text{Equation 4}\rangle$$
$$w = 1, \ldots, W, \quad h = 1, \ldots, H$$

Also, the arm angle calculation unit 125 uses the angle information and the location information as in Equation 5 to obtain determination information F, secondary information needed for the calculation of the angle of the arm.

$$F(i) = \begin{cases} F_{ang}(i) & \text{if } i \leq B \\ F_{loc}(i-B) & \text{if } i > B \end{cases} \quad i = 1, \ldots, (B + WH) \quad \langle\text{Equation 5}\rangle$$

Figures 9A, 9B:
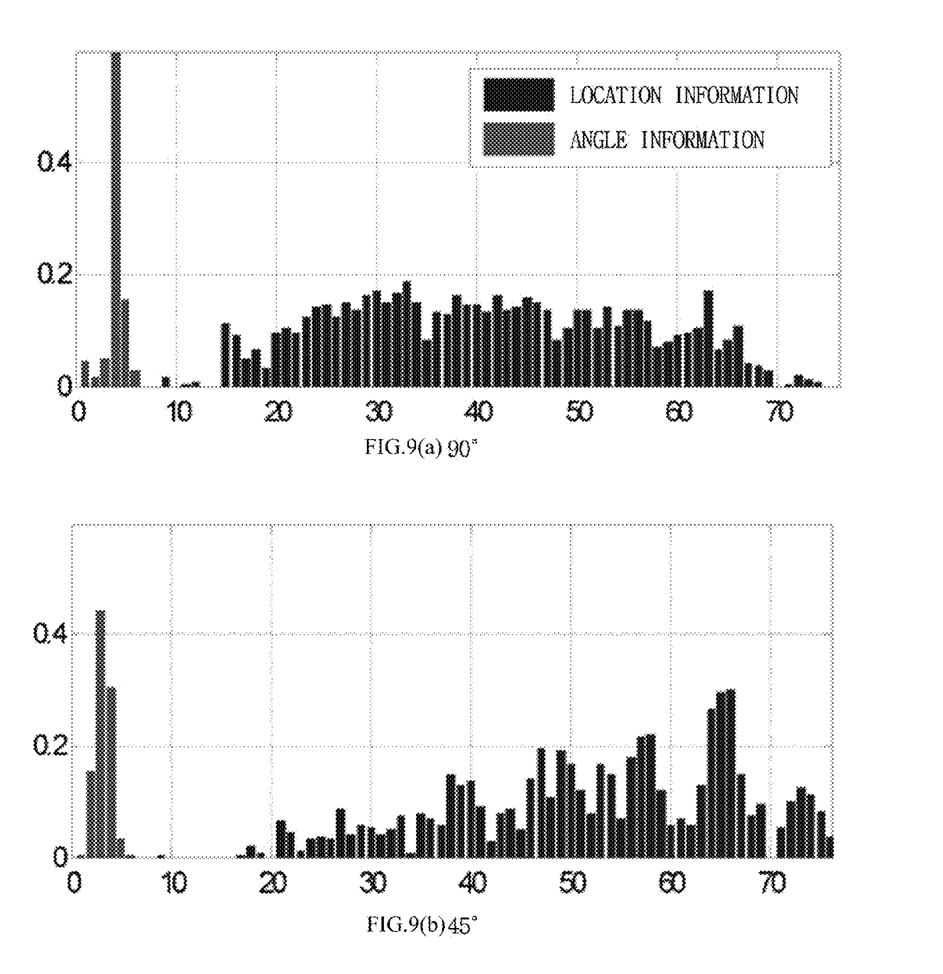
FIGS. 9a and 9b show secondary information obtained by the arm angle calculation unit.

FIGS. 9a and 9b show secondary information obtained by an arm angle calculation unit.

FIG. 9a shows a characteristic when the angle of an arm is 0 degree, and FIG. 9b shows a characteristic when the angle of the arm is 45 degrees.

Referring to FIGS. 9a and 9b, it may be confirmed that it is possible to have different characteristic forms according to the angle of each arm, from a result found by an arm angle characteristic extraction algorithm.

The arm angle calculation unit 125 compares finally obtained, secondary information with the reference information stored in the memory 13 to calculate the angle of an arm.

That is, the memory 13 stores information corresponding to the secondary information obtained by performing experiments many times for the angle of the arm and the arm angle calculation unit 125 compares obtained, secondary information with the reference information stored in the memory 13 to calculate the angle of the arm.

When the angle of the arm is calculated by the arm angle calculation unit 125, the function execution unit 126 recognizes a function intended by the angle of the arm in step S7, and enables the robot cleaner 1 to execute a recognized function in step S8.

In order to check the performance of the arm angle characteristic extraction algorithm in the present embodiment, an experiment has been performed on an image obtained by a robot cleaner camera. 14 users have participated in the experiment, and performance and time have been measured on a total of 598 images having a resolution of 320×240 of two gestures having an angle of an arm being 90 degrees (or may also be said to be 0 degree) and −45 degrees.

The classification of the gestures, i.e., the calculation of the angle of the arm has used a support vector machine learnt with a proposed characteristic.

Figure 10:
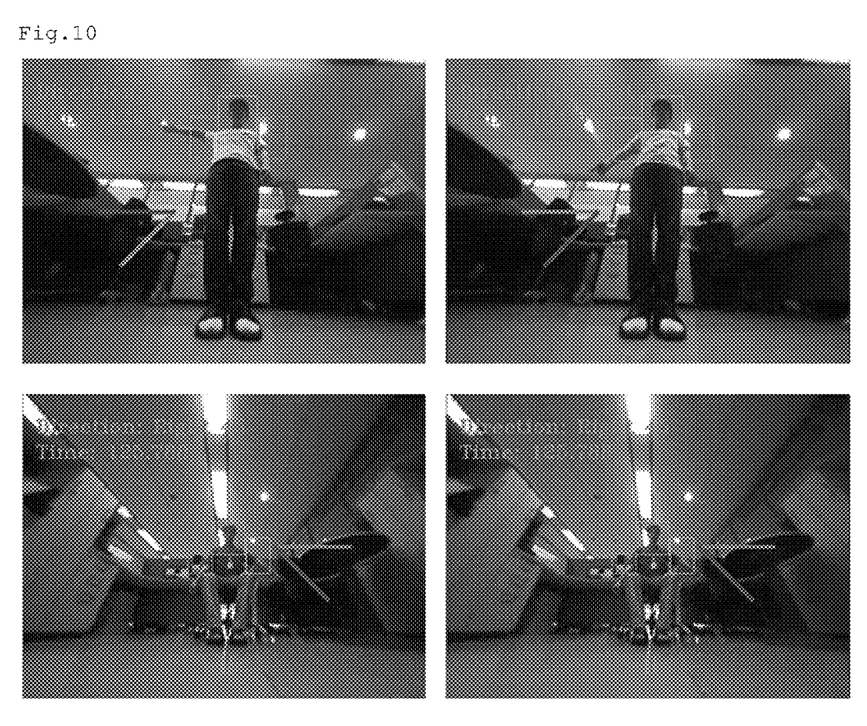
FIG. 10 shows a gesture recognition result obtained by performing an arm angle characteristic extraction algorithm on an image obtained by a camera installed at a robot cleaner.
Figure 11:
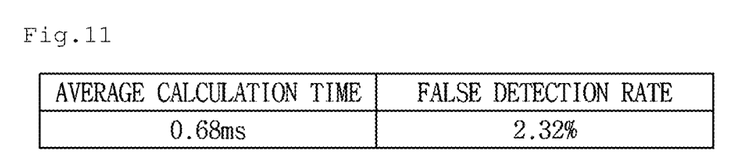
FIG. 11 shows a result representing the extraction time and false detection rate of a characteristic using the arm angle characteristic extraction algorithm.

FIG. 10 shows a gesture recognition result obtained by performing an arm angle characteristic extraction algorithm on an image obtained by a camera installed at a robot cleaner, and FIG. 11 shows a result representing the extraction time and false detection rate of a characteristic using the arm angle characteristic extraction algorithm.

Referring to FIG. 10, it may be seen that the actual angel of an arm of a human being is different in location information from angle information calculated according to a location, and it is possible to clearly calculate the angle of the arm by using such result information.

According to a proposed embodiment, it may be confirmed that a short time is consumed and an false detection rate is significantly low, because it is easy to calculate arm angle characteristic extraction with respect to the gesture of a user.

Also, there is an advantage in that costs needed for the gesture recognition apparatus or the robot cleaner may decrease, because it is possible to recognize the gesture of the user even if a camera capable of taking a black and white image instead of a stereo camera is used.

Also, by extracting an arm angle characteristic, there is an advantage in that it is possible to extract an arm angle characteristic from a low quality image.

Also, since a real-time arm angle characteristic may be extracted for a single image and not for sequence image (information), a calculation speed may increase and accuracy in the extraction of the arm angle characteristic may be enhanced.

An embodiment provides a computer readable recording medium recording a computer program that may execute the gesture recognition method with a computer.

The recording medium may include a program command, a data file, a data structure, etc. solely or in combinations thereof. An embodiment may be practiced as a computer program product including a machine-accessible medium that has an embedded command capable of being used in programming a processing system or other electronic devices. Such a recording medium may also be a transmission medium or writable medium for machine-readable information that includes a magnetic medium, optical medium or other proper mediums. Such a recording medium includes program commands that enable the arm angle extraction algorithm to be executed. The program command may be used for generating a general-purpose or special-purpose processing system programmed as a command performing the operations described in the present disclosure.

Although the above embodiments describe that the gesture recognition apparatus is installed at the robot cleaner, the gesture recognition apparatus may also be installed at other home appliances excluding the robot cleaner, and the gesture recognition apparatus may also be configured in a separate module to be independently used.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A robot cleaner comprising:
    a camera to obtain an image comprising a user of the robot cleaner; and
    a control unit to extract from the user image an arm image of an arm of the user, calculate an angle of the arm from the arm image, and determine a function intended by the calculated angle of the arm to control an execution of the determined function,
    wherein the control unit comprises:
    an image processing unit to divide the arm image into a plurality of cell images;
    a histogram calculation unit to locate gradients on the plurality of cell images and calculate histograms in each gradient direction; and
    a primary angle calculation unit to calculate primary angles for each cell image based on the calculated histogram of each cell image,
    wherein the primary angle calculation unit calculates, as a primary angle of a calculated histogram, an angle corresponding to a bin having a highest value and having a value equal to or larger than a reference value for each histogram.

2. The robot cleaner according to claim 1, further comprising:
    a casing on which the camera is disposed; and
    a moving device to move the casing,
    wherein the control unit controls the moving device based on the calculated angle of the arm.

3. The robot cleaner according to claim 1, wherein the control unit further comprises:
    a score calculation unit to calculate a score of each cell image based on the calculated primary angle of each cell image; and
    an arm angle calculation unit to calculate the angle of the arm based on the calculated score of each cell image.

4. The robot cleaner according to claim 3, wherein the image processing unit extracts a face image and a shoulder image of the user from the image obtained by the camera and recognizes the arm of the user based on the extracted face and shoulder images.

5. The robot cleaner according to claim 3, wherein the score calculation unit calculates the score of each cell image based on a similarity of the histogram of each cell image to a histogram adjacent in a primary angle direction and a similarity of the histogram of each cell image to a histogram adjacent in a direction perpendicular to the primary angle.

6. The robot cleaner according to claim 3, further comprising a memory to store reference information for calculation of the angle of the arm,
    wherein the arm angle calculation unit extracts an angle information and a location information required for calculation of the angle of the arm based on the calculated score of each cell image, extracts determination information by using the angle information and the location information, and calculates the angle of the arm by using the extracted determination information and the reference information stored in the memory.

7. An apparatus for recognizing a gesture, the apparatus comprising:
    a camera to obtain an image comprising a user of the apparatus; and
    a control unit to extract from the user image an image of an arm of the user, and calculate an angle of the arm,
    wherein the control unit comprises:
    an image processing unit to divide the arm image into a plurality of cell images;
    a histogram calculation unit to locate gradients on the plurality of cell images and calculate histograms in each gradient direction; and
    a primary angle calculation unit to calculate primary angles for each cell image based on the calculated histogram of each cell image,
    wherein the primary angle calculation unit calculates, as a primary angle of a calculated histogram, an angle corresponding to a bin having a highest value and having a value equal to or larger than a reference value for each histogram.

8. The apparatus according to claim 7, wherein the control unit further comprises:
    a score calculation unit to calculate a score of each cell image based on the calculated primary angle of each cell image; and
    an arm angle calculation unit to calculate the angle of the arm based on the calculated score of each cell image.

9. The apparatus according to claim 8, further comprising a memory to store reference information for calculation of the angle of the arm,
    wherein the arm angle calculation unit extracts an angle information and a location information required for calculation of the angle of the arm based on the calculated score of each cell image, extracts determination information by using the angle information and the location information, and calculates the angle of the arm by using the extracted determination information and the reference information stored in the memory.

10. A method for recognizing a gesture, the method comprising:
    extracting, by an image processing unit, an arm image from an image obtained by a camera;
    dividing, by the image processing unit, the extracted arm image into a plurality of cell images and calculating a histogram of each cell image;
    calculating, by a primary angle calculation unit, a primary angle for each cell image based on the histogram of each cell image;
    calculating, by score calculation unit, a score of each cell image based on the primary angle of each cell image; and
    calculating, by an arm angle calculation unit, an angle of the arm based on the calculated score of each cell image, wherein the calculating the primary angle comprises:
calculating, by the primary angle calculation unit, as a primary angle of a calculated histogram, an angle corresponding to a bin having a highest value and having a value equal to or larger than a reference value for each histogram.

11. The method according to claim 10, wherein the calculating of the angle of the arm comprises:
extracting, by the arm angle calculation unit, an angle information and a location information needed for extraction of the angle of the arm based on the calculated score of each cell image;
extracting, by the arm angle calculation unit, determination information by using the angle information and the location information; and
calculating, by the arm angle calculation unit, the angle of the arm by using the extracted determination information and the reference information stored in the memory.

12. The method according to claim 11, further comprising:
controlling a robot cleaner, by a function execution unit, wherein the function execution unit controls the robot cleaner based on the calculated angle of the arm.

13. The method according to claim 10, further comprising:
extracting, by the image processing unit, a face image and a shoulder image of a user from the image obtained by the camera and recognizes the arm of the user based on the extracted face and shoulder images.

14. The method according to claim 10, further comprising:
calculating, by the score calculation unit, the score of each cell image based on a similarity of the histogram of each cell image to a histogram adjacent in a primary angle direction and a similarity of the histogram of each cell image to a histogram adjacent in a direction perpendicular to the primary angle.

15. The method according to claim 10, further comprising:
storing, in a memory, reference information for calculation of the angle of the arm.

* * * * *